US007716336B2

(12) United States Patent  (10) Patent No.: US 7,716,336 B2
Coppinger et al.  (45) Date of Patent: May 11, 2010

(54) RESOURCE RESERVATION FOR MASSIVELY PARALLEL PROCESSING SYSTEMS

(75) Inventors: Richard J. Coppinger, Milton, NY (US); Alexander Druyan, Poughkeepsie, NY (US); Enci Zhong, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 11/553,511

(22) Filed: Oct. 27, 2006

(65) Prior Publication Data

US 2007/0255835 A1  Nov. 1, 2007

Related U.S. Application Data

(63) Continuation-in-part of application No. 11/414,029, filed on Apr. 28, 2006, now abandoned.

(51) Int. Cl.
*G06F 15/173* (2006.01)
*G06F 15/16* (2006.01)

(52) U.S. Cl. .................. 709/226; 709/201; 709/229
(58) Field of Classification Search .................. 709/226
See application file for complete search history.

(56) References Cited

U.S. PATENT DOCUMENTS

| | | | | |
|---|---|---|---|---|
| 4,896,269 A | * | 1/1990 | Tong | 700/101 |
| 5,103,393 A | * | 4/1992 | Harris et al. | 709/226 |
| 5,179,702 A | * | 1/1993 | Spix et al. | 718/102 |
| 7,065,764 B1 | * | 6/2006 | Prael et al. | 718/102 |
| 2004/0015973 A1 | * | 1/2004 | Skovira | 718/103 |
| 2004/0215780 A1 | * | 10/2004 | Kawato | 709/226 |
| 2005/0283782 A1 | * | 12/2005 | Lu et al. | 718/100 |

OTHER PUBLICATIONS

Choi, H-A. et al. "Scheduling on Parallel Processing Systems Using Parallel Primitives" [Online], 1990 [Retrieved Dec. 2009], IEEE, <http://ieeexplore.ieee.org/stamp/stamp.jsp?tp=&arnumber=77117&isnumber=2567>, pp. 56-65.*

* cited by examiner

*Primary Examiner*—Jeffrey Pwu
*Assistant Examiner*—Youpaporn Nilanont
(74) *Attorney, Agent, or Firm*—Matthew W. Baca; Amy J. Pattillo

(57) ABSTRACT

Disclosed are a method, information processing system, and computer readable medium for reserving resources in a massively parallel processing system comprising. The method includes receiving a reservation request for reserving at least one resource within a massively parallel processing system. The massively parallel processing system includes compute nodes, base partitions, switches, wires, and node cards. The reservation type associated with the reservation is determined. The reservation type is at least one of a number of compute nodes, a base partition list, a particular shape configuration, a particular job, and a particular partition. A set of requirements is generated based on the reservation type. A set of resources is identified for satisfying the set of requirements and the set of resources is reserved.

8 Claims, 7 Drawing Sheets

RESOURCE RESERVATION FOR MASSIVELY PARALLEL PROCESSING SYSTEMS

CROSS-REFERENCE TO RELATED APPLICATIONS

This application is a continuation-in-part from prior U.S. patent application Ser. No. 11/414,029, entitled "RESOURCE RESERVATION SYSTEM, METHOD AND PROGRAM PRODUCT USED IN DISTRIBUTED CLUSTER ENVIRONMENTS," filed on Apr. 28, 2006, now abandoned the entire disclosure of which is herein incorporated by reference.

FIELD OF THE INVENTION

The present invention generally relates to the field of scheduling jobs in a computing environment, and more particularly relates to scheduling jobs in a massively parallel processing system.

BACKGROUND OF THE INVENTION

In a distributed cluster of computers, a job scheduler is often used to manage when and where jobs run for more efficiently utilizing the resources in the cluster. A job scheduler receives job requests from end users and then dispatches the jobs to various computers. Job scheduling needs to be performed in such a way that critical workload can run when desired and on the machine resources required. Additionally, a job scheduling scheme should be able to efficiently set aside time on a set of machines for maintenance purposes.

One job scheduling function is advance reservation, which can enable computing resources to be reserved in advance so that they can be dedicated to run a certain workload or be used for maintenance purposes. However, current job schedulers support advance reservations are not compatible with massively parallel processing systems such as a Blue Gene/L system of International Business Machines Corporation ("IBM") of White Plains, N.Y., United States of America. A job associated with a Blue Gene/L system is run on a subset of Blue Gene/L hardware components. These components are exclusively allocated to that job. Current job schedulers incorporating advance reservation are not capable of taking into account the specific resources of a massively parallel processing system and cannot perform advance reservation for these systems.

Therefore a need exists to overcome the problems with the prior art as discussed above.

SUMMARY OF THE INVENTION

Briefly, in accordance with the present invention, disclosed are a system, method, and computer readable medium for reserving resources in a massively parallel processing system. The method includes receiving a reservation request for reserving at least one resource within a massively parallel processing system The massively parallel processing system includes compute nodes, base partitions, switches, wires, and node cards. The reservation type associated with the reservation is determined. The reservation type is at least one of a number of compute nodes, a base partition list, a particular shape configuration, a particular job, and a particular partition. A set of requirements is generated based on the reservation type. A set of resources is identified for satisfying the set of requirements and the set of resources is reserved.

In another embodiment an information processing system for reserving resources In a massively parallel processing system is disclosed. The information processing system includes a memory and a processor that is communicatively coupled to the memory. An advance reservation module is communicatively coupled to the memory and the processor. The advance reservation module is for receiving a reservation request for reserving at least one resource within a massively parallel processing system. The massively parallel processing system includes compute nodes, base partitions, switches, wires, and node cards. The reservation type associated with the reservation is determined. The reservation type is at least one of a number of compute nodes, a base partition list, a particular shape configuration, a particular job, and a particular partition. A set of requirements is generated based on the reservation type. A set of resources is identified for satisfying the set of requirements and the set of resources is reserved.

In another embodiment, a computer readable medium for reserving resources in a massively parallel processing system is disclosed. The computer readable medium comprises instructions for receiving a reservation request for reserving at least one resource within a massively parallel processing system. The massively parallel processing system includes compute nodes, base partitions, switches, wires, and node cards. The reservation type associated with the reservation is determined. The reservation type is at least one of a number of compute nodes, a base partition list, a particular shape configuration, a particular job, and a particular partition. A set of requirements is generated based on the reservation type. A set of resources is identified for satisfying the set of requirements and the set of resources is reserved.

One advantage of the present invention is that an advance reservation system ("ARS") for a massively parallel processing system is provided. The advance reservation system reserves resources for special purposes such as running a high priority workload or performing maintenance during a specified period of time and optimizes reservation related balancing for the massively parallel processing system. The ARS is able to handle advance reservation of resources for the massively parallel processing system.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Exemplary Massively Parallel Processing System

Figure 1:
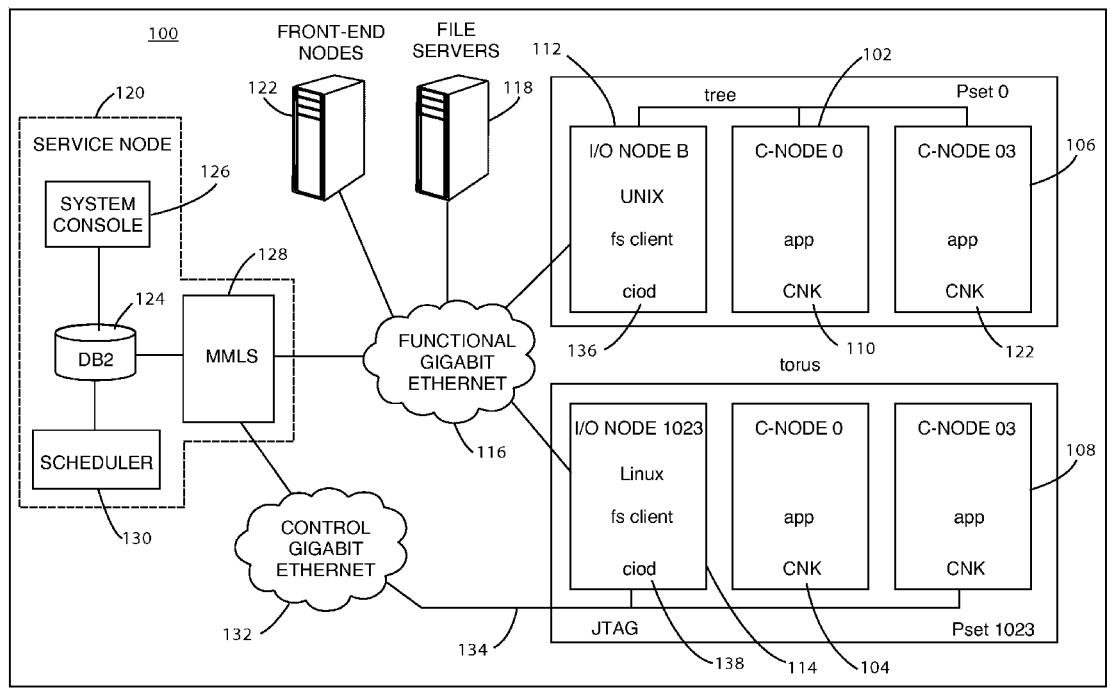
FIG. 1 is a block diagram illustrating an exemplary massively parallel processing system according to an embodiment of the present invention.

According to an embodiment of the present invention, as shown in FIG. 1, an exemplary massively parallel processing system 100 is illustrated. The example of FIG. 1 is directed towards a Blue Gene/L system. However, the present invention is applicable to any massively parallel processing system comprising compute nodes, base partitions, switches, wires, and node cards. The massively parallel processing system 100, in this embodiment, includes a plurality of compute nodes 102, 104, 106, 108. Each compute node 102, 104, 106, 108 comprises a processor. A compute node kernel ("CNK") 110 resides within each compute node 102, 104, 106, 108. The CNK is a lightweight kernel that forwards system calls off the compute node for service.

The compute nodes 102, 104, 106, 108 are the computing engines of the massively parallel processing system 100. The massively parallel processing system 100 also includes I/O nodes 112, 114, which are similar to the compute nodes 102, 104, 106, 108. For example, an I/O node 112, 114 also includes a processor. However, an I/O node 112, 114 can comprise additional memory and includes network hardware such as an Ethernet port. The compute nodes 102, 104, 106, 108 communicate with the I/O nodes 112, 114 for receiving data to process. The I/O nodes 112, 114 include a control and I/O daemon ("CIOD") 136, 138. The CIOD is a process that receives the I/O request from the CNK 110.

The Ethernet port allows the I/O node 112, 114 to connect to a network such as the gigabit (functional) network 116 for performing file I/O operations. The gigabit network 116 provides the massively parallel processing system 100 with a means for exchanging data and to load programs. For example, a file server 118 communicatively coupled to the gigabit network 116 provides a file system that is accessible by the I/O nodes 112, 114. The programs and data to be processed by the massively parallel processing system 100 are prepared outside of the system 100. In other words the massively parallel processing system 100 does not comprise local disks within the system 100. Therefore the file server 118 comprises a global file system that is shared by the massively parallel processing system 100 via the I/O nodes 112, 114 with a service node 120 and front end nodes 122.

A node card in the massively parallel processing system 100 can hold 32 compute nodes and optional I/O nodes. A midplane or base partition ("BP") can include 16 compute cards or 512 compute nodes plus a number of I/O nodes. A rack can hold two midplanes and the massively parallel processing system 100, in one embodiment, can connect up to 64 racks.

The service node 120 is communicatively coupled to the massively parallel processing system 100. The service node 120 controls and manages the system 100. In one embodiment, the service node 120 monitors the configuration of the system 100 and provides a user/administrator the ability to initiate any action on the system 100. For example, through the service node 120, the system 100 can be managed and partitioned. Additionally, compute nodes and I/O nodes in any of the partitions can be booted and have jobs submitted to them through the service node 120.

FIG. 1 shows the service node 120 as including a database 124, system console 126, midplane management control system ("MMCS") 128, and a scheduler 130. The database 124 comprises inventory and status information for all components of the massively parallel processing system 100. The database 124 also includes information associated with all jobs running on the massively parallel processing system 100. The database 124 can alternatively reside outside of the service node 120. For example, the database 124 can reside on a remote information processing system communicatively coupled to the service node 120. The system console 120 allows an administrator to interact with the service node 120 and the massively parallel processing system 100. The MMCS 128 allows for the service node 120 to manage the massively parallel processing system 100. The scheduler 130 provides for job scheduling and an advance reservation system for the massively parallel processing system 100. The advance reservation scheduling process is discussed in greater detail below.

The massively parallel processing system 100 is also communicatively coupled to front end nodes 122, which are information processing systems. The front end nodes 122 allow users to interact with the massively parallel processing system 100. For example, a user can log on to a font end node 122 and submit a job to the massively parallel processing system 100. The service node 120 allocates the necessary resources on the system 100 for the submitted jobs to run. The service node 120 and the front end nodes 122, in this embodiment, are not part of the system 100. They form a cluster with the system 100 referred to as a massively parallel computing cluster. A massively parallel computing cluster may include other information processing systems which are not a service node or a front-end node to the massively parallel processing system 1 00.

To run an application or job on the system 100, an initiating program, in one embodiment, is started on a front-end node 122 and the application executable is started on a set of massively parallel computing resources called a partition. A partition can be defined by the system 100 administrator or the job scheduler 130 for the massively parallel computing cluster. In one embodiment, one partition is entirely dedicated to a user job. Other jobs do not have access the partition while the current job is running. Once the current job is finished, the partition may be freed for another user.

The communication networks inside a partition are isolated from the rest of the massively parallel processing system 100. A partition usually contains multiple BPs connected via switches and wires to form a TORUS or MESH network and a 3D shape. Each partition also includes at least one system I/O node 112, 114. In one embodiment, the I/O node is required because without it, communication between the compute nodes and the external file system 118 is not possible. Small partitions of 32 or 128 compute nodes are also possible. As a job has to be run within a partition and only certain sizes are possible for a partition, a partition may include more resources than actually required by a job. The massively parallel processing system 100 and its components is discussed in greater detail in the Published Application No. 2004/0103218 entitled "Novel Massively Parallel Supercomputer", which is commonly owned by International Business Machines Corporation ("IBM") of White Plains, N.Y., United States of America and is hereby incorporated by reference in its entirety.

Exemplary Networks of the Massively Parallel Processing System

Figure 2:
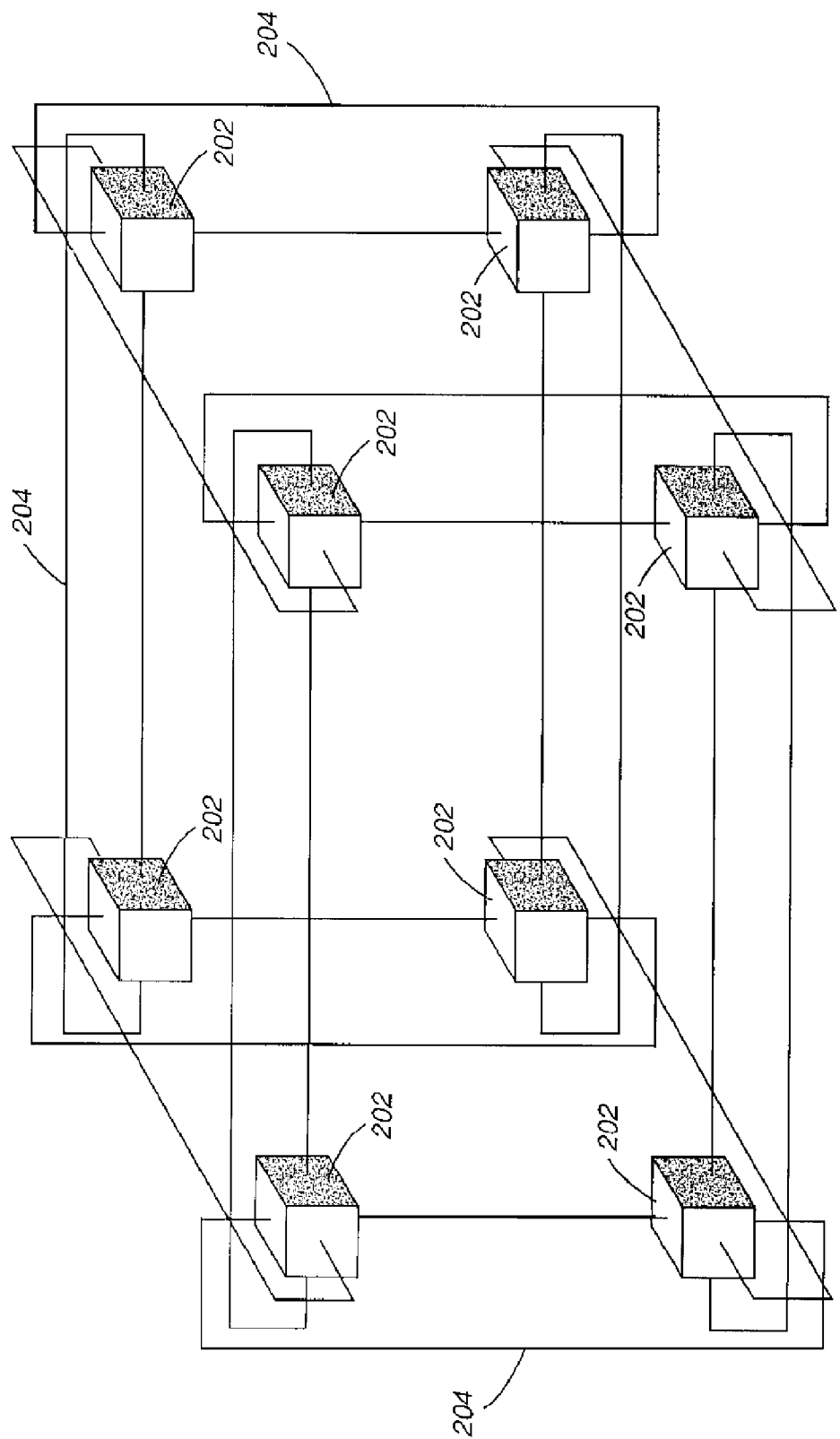
FIG. 2 shows a small portion of a three-dimensional torus geometry according to an embodiment of the present invention.

In one embodiment, the massively parallel processing system 100 utilizes separate networks for different types of communications as compared to implementing a single type of network capable of transmitting all protocols needed in such an environment. The first network is a three dimensional torus network that allows for point-to-point messaging between the compute nodes. For example, FIG. 2 shows a small portion of a three-dimensional torus geometry interconnecting eight computing nodes out of a typical base torus configuration of 512 computing nodes. FIG. 2 shows a compute node 202 being connected to its six neighbors by bidirectional torus link 204. It is understood however, that other architectures comprising more processing nodes in different torus configurations (e.g., torus' in 4 or more dimensions) are contemplated including those described in commonly-owned, co-pending U.S. patent application Ser. No. 10/468,993 (Publication Number US 2004/0103218) entitled "Novel Massively Parallel Supercomputer".

As can be seen from FIG. 2, the torus architecture connects the nodes along logical x, y, and z axes. A torus can be created from a mesh by connecting the opposite cubes in a closing loop. With respect to the torus network, it is preferably of 3-dimensional design supporting cuboidal or rectangular communication and partitioning. A 3-Dimensional design allows a direct mapping of computational simulations of many physical phenomena to the Torus network. However, higher dimensionality, i.e., 4, 5 or 6-dimensional Toroids, allows shorter and lower latency paths at the expense of more chip-to-chip connections and significantly higher cabling costs. Lower dimensions give longer latency and fewer chip-to-chip communications. The torus network provides both adaptive and deterministic minimal-path routing, and is deadlock free.

The next network is referred to as a collective network. The three dimensional torus is an efficient network for communicating with neighbors. However, during program run, some calls are more global than others such as all-to-one, one-to-all, and all-to-all. For these, the massively parallel processing system 100 provides the collective network. The collective network connects all the compute nodes in the shape of a tree. In a collective network, any node can be the tree root (originating point).

Another network included in the massively parallel processing system 100 is a barrier (global interrupt) network. The barrier network is used by the system 100 for coordinating tasks. For example, the work being performed by multiple tasks running in parallel need to be coordinated by parallel applications. The barrier network provides a network for this coordination.

As discussed above, all interactions between the compute nodes and the outside world are carried through the I/O nodes under the control of the service node 120. Therefore, the massively parallel processing system 100 provides two networks connecting the service node to the I/O nodes. These networks are the gigabit network 116 and the service network 132, which is essentially another Ethernet network, but is converted to the internal JTAG network 134 via service cards. The gigabit functional network 116 is used to mount the global file system 118 for allowing the system 100 access to file I/O. The I/O nodes 112, 114 further communicate to compute nodes through the collective network. The service network (JTAG network) grants the service node 120 direct access to the massively parallel processing system nodes. The service network is used to boot the nodes (initialize the hardware, load the kernel, and the like). Each node card has a chip that converts the JTAG connections coming from both compute and I/O nodes into a 100 Mbps Ethernet network, which is further connected to the service node 120.

Advance Reservation

When a user or an information processing system coupled to the massively parallel processing system 100 wants to run a job it must be scheduled by the job scheduler 130 for workload balance and resource usage optimization. The scheduler 130 of the present invention provides an advance reservation system ("ARS") 320 (FIG. 3) for the massively parallel processing system 100. In one embodiment, components of the service node 120 such as the scheduler 130 comprise the ARS 320. It should be noted that the ARS 320 can be a separate module residing within the service node 130. The advance reservation system manages resource reservation for the system 100. ARS 320 provides for resource management in advance by granting resource reservation requests when possible. Only jobs designated to be eligible are allowed to run on reserved resources or in certain cases when resource availability is not an issue or when special or preemptive conditions allow it other jobs can also run.

The ARS 320 is able to handle advance reservation of resources for the massively parallel processing system 100. A massively parallel processing system job executes on a partition, which is a collection of c-nodes (compute nodes), BPs (base partitions), switches, wires, and node cards. Furthermore, a corresponding initiating and monitoring job which is called mpirun executes on a machine which is called the FEN (Front End Node). Advance reservation on Blue Gene allows the users to specify one of the following:

The number of c-nodes to be reserved together with the way these c-nodes are to be connected (TORUS, MESH, or PREFER_TORUS);

The triplet of numbers specifying the shape in which the c-nodes will be reserved together with the way these c-nodes are to be connected (TORUS, MESH, or PREFER_TORUS) inside of the specified shape;

The list of BPs to be reserved together with the way these BPs are to be connected (TORUS, MESH, PREFER_TORUS);

The name of a pre-defined partition whose components are to be reserved.

As discussed above, a massively parallel computing cluster is a distributed cluster of information processing systems including a massively parallel processing system and a number of other information processing systems referred to from hereon in as regular systems. The regular systems may act as the service node 120 or the front-end node 122 of the massively parallel processing system 100. A job to be run on the system 100 is called a massively parallel computing job. A job that is run on the regular systems is referred to as a regular job. A reservation used for running only regular jobs is referred to as a regular reservation. A reservation used for running a massively parallel computing job is referred to as a massively parallel computing reservation. A reservation that can be used to run both regular jobs and massively parallel computing jobs is referred to as an all-purpose reservation.

The most common use of a reservation is to run jobs, therefore the massively parallel computing resources that are reserved by the ARS 320 must be able to run at least one job. In other words there must be enough resources to form at least one massively parallel computing partition. A partition includes compute nodes, I/O nodes, switches, and wires. The ARS 320 reserves all of these components for a massively parallel computing reservation In one embodiment, the most direct method for specifying what to reserve for a massively parallel computing reservation is to specify a list for each type of the system 100 components. However, this is only plausible for small reservations like a node card or a few BPs. For a large massively parallel computing reservation, this is very difficult to do as there are too many massively parallel computing components to specify. In addition, this direct method requires expert knowledge to make a sensible selection of the massively parallel computing components to avoid wasting resources (resources must be related in certain ways to be able to form a partition for running a job).

Therefore, the ARS 320 of the present invention provides more practical ways to specify what resources to reserve. For example, the ARS 320 allows a user or information processing system to reserve resources by specifying a predefined partition; specifying a job; specifying the number of compute nodes; specifying the shape of the BPs to reserve; and specifying a list of BPs. If a job is specified for a resource reservation request, the ARS 320 reserves enough resources to form a partition which can satisfy the requirements specified in the job. The scheduler 130 schedules the job so that the required resources for the job can be placed in the reservation. Specifying the number of computes nodes can be considered a special case of specifying a job. The ARS 320 can create a pseudo job and let it go through job scheduling to find the resources needed for the reservation. The network connection can be defaulted to be torus or mesh or be taken as additional input.

Specifying the shape of the BPs to reserve is similar to specifying the number of compute nodes. When the shape is specified, the specification includes both the number of BPs to reserve and what kind of 3D shape the required partition shape. When a list of BPs is specified, the ARS 320 reserves the entire set of BPs that were specified. Additional switches and wires can also be added to a reservation. However, this is allowed only if those switches and wires are used by the BPs in the reservation and not by any BPs outside of the reservation. A reservation may be made to run a plurality of jobs and the additional wires allow for more jobs to run at the same time in the reservation. Also, a torus network connection needs more wires than the mesh network connection.

In one embodiment, a front end node 122 is needed to run a massively parallel computing job. Therefore, a massively parallel computing reservation can include a front end node 122. In most cases, a massively parallel computing job only uses a very small amount of the resources on the front end node. In some installations, only one or two front end nodes 122 may be available to handle all of the massively parallel computing jobs. In such cases, it is more advantageous to not include a front end node 122 in the massively parallel computing reservation. Instead, one or more of the front-end nodes 122 are marked as "reservation not permitted" and allow all massively parallel computing jobs (whether running inside a reservation or not) to share the front-end nodes 122.

In a massively parallel computing cluster, reservations can still be made either for running jobs or for maintenance purposes. Generally, the front-end nodes 122 and service node 120 are not be used for regular reservations. This prevents the massively parallel processing system 100 from being underused. A general purpose reservation can be thought of as the combination of two reservations, a massively parallel computing reservation and a regular reservation. A general purpose reservation is not always necessary and can he made if there is a need for such kind of reservation.

A job must be bound to a reservation in order for it to be run in the reservation. In one embodiment, a regular job can be bound to a regular reservation or a general purpose reservation. A massively parallel computing job can be bound to a massively parallel computing or a general purpose reservation. If a massively parallel computing reservation includes a front end node 122, the jobs bound to the reservation only use resources reserved by the reservation. If a massively parallel computing reservation does not include a front end node 122, a front-end node 122 outside of the reservation is shared in order to run the bound massively parallel computing jobs.

Reservations cannot overlap, that is, a resource can not be reserved by two reservations at the same time. Policies can be set for not allowing a job and a reservation to overlap. In the process of making a reservation, checks are made for ensuring that the resource to be reserved is not already in use by another reservation or a job during the requested reservation time period. A list or a hash table can be used to gather either the free resources or the used resources to help with the resource availability checking. A massively parallel processing system includes a large number of wires and switches and other components. Therefore, a more advantageous way to manage the availability checking is to mark a component as free or used before checking each reservation request. A resource component is considered free if it is free (not reserved) during the requested reservation time period.

All the features and policies available for a regular reservation can also be shared by a massively parallel computing reservation. A massively parallel computing reservation can have the option of being automatically removed by the job scheduler if it is idle. The massively parallel computing reservation can have its resources shared with outside jobs if all of its bound jobs have found resources to run. A bound job can be allowed to run beyond the end time of the reservation or only jobs that can finish before the reservation end will be allowed to run.

Exemplary Information Processing System

Figure 3:
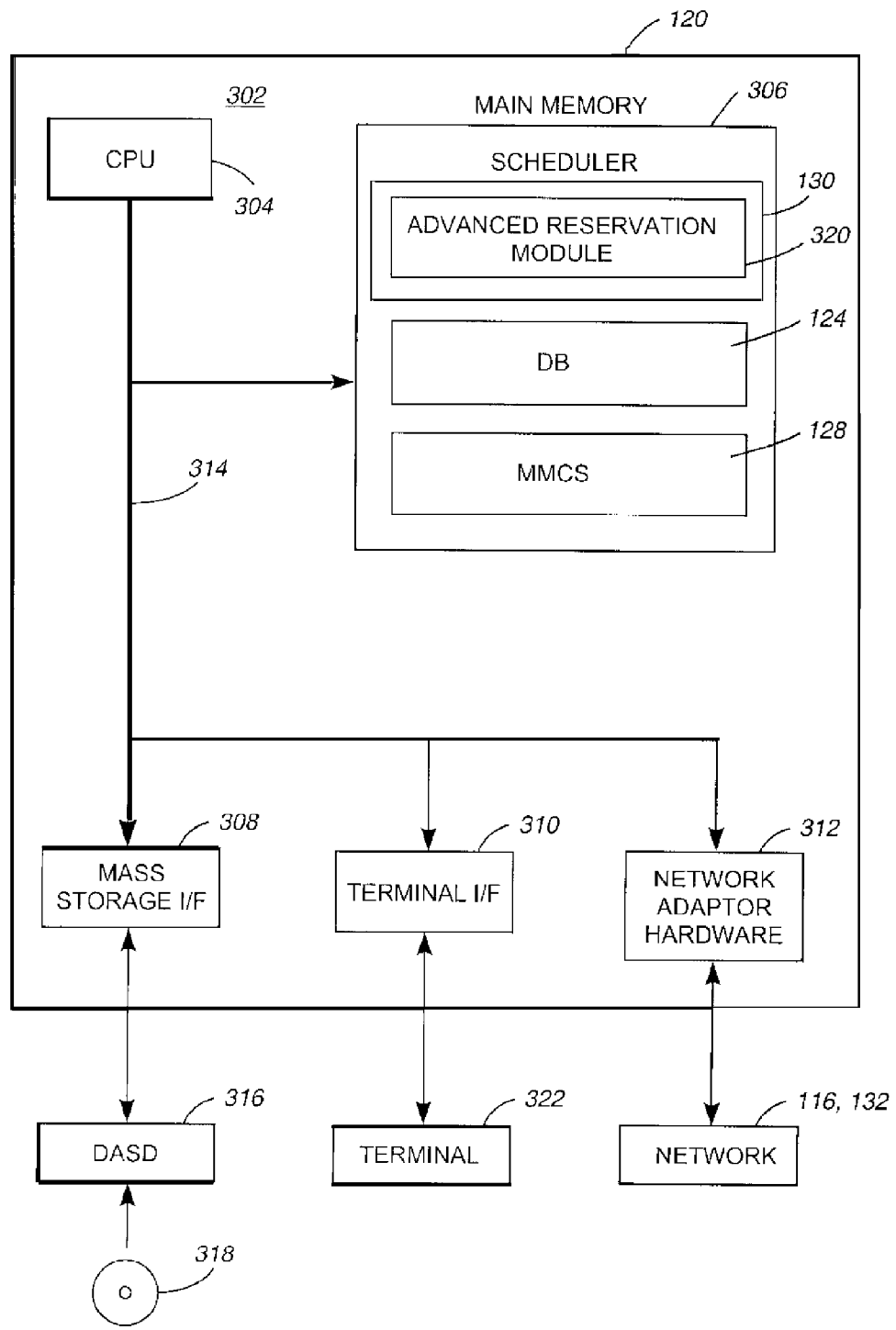
FIG. 3 is a block diagram illustrating a detailed view of an information processing system according to an embodiment of the present invention.

FIG. 3 is a detailed view of an information processing system such as the service node 120. FIG. 3 is a block diagram illustrating a detailed view of the service node 120 according to an embodiment of the present invention. The service node 120, in one embodiment, is based upon a suitably configured processing system adapted to implement the exemplary embodiment of the present invention. Any suitably configured processing system is similarly able to be used as the service node 120 by embodiments of the present invention, for example, a personal computer, workstation, or the like.

The service node 120 includes a computer 302. The computer 302 has a processor 304 that is communicatively connected to a main memory 306 (e.g., volatile memory), non-volatile storage interface 308, a terminal interface 310, and a network adapter hardware 312. A system bus 316 interconnects these system components. The non-volatile storage interface 308 is used to connect mass storage devices, such as data storage device 318, to the service node 120. One specific type of data storage device is a computer readable medium such as a CD drive, which may be used to store data to and read data from a CD or DVD 320 or floppy diskette (not shown). Another type of data storage device is a data storage device configured to support, for example, NTFS type file system operations.

The main memory includes the scheduler 130, the database 124, and the MMCS 128. The scheduler 130, in one embodiment, includes the ARS module 320. These components were discussed in greater detail above. Although illustrated as concurrently resident in the main memory 306, it is clear that respective components of the main memory 306 are not required to be completely resident in the main memory 306 at all times or even at the same time. In one embodiment, the service node 120 utilizes conventional virtual addressing mechanisms to allow programs to behave as if they have access to a large, single storage entity, referred to herein as a computer system memory, instead of access to multiple, smaller storage entities such as the main memory 306 and data storage device 316. Note that the term "computer system memory" is used herein to generically refer to the entire virtual memory of the service node 120.

Although only one CPU 304 is illustrated for computer 302, computer systems with multiple CPUs can be used equally effectively. Embodiments of the present invention further incorporate interfaces that each includes separate, fully programmed microprocessors that are used to off-load processing from the CPU 304. Terminal interface 310 is used to directly connect one or more terminals 340 to computer 302 to provide a user interface to the computer 302. These terminals 340, which are able to be non-intelligent or fully programmable workstations, are used to allow system administrators and users to communicate with the thin client. The terminal 340 is also able to consist of user interface and peripheral devices that are connected to computer 302 and controlled by terminal interface hardware included in the terminal I/F 310 that includes video adapters and interfaces for keyboards, pointing devices, and the like.

An operating system (not shown), according to an embodiment, can be included in the main memory and is a suitable multitasking operating system such as the Linux, UNIX, Windows XP, and Windows Server operating system, Embodiments of the present invention are able to use any other suitable operating system, or kernel, or other suitable control software. Some embodiments of the present invention utilize architectures, such as an object oriented framework mechanism, that allows instructions of the components of operating system (not shown) to be executed on any processor located within the client. The network adapter hardware 312 is used to provide an interface to various networks 116, 132. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD ROM 320, or other form of recordable media, or via any type of electronic transmission mechanism.

Exemplary Process of Reserving a Resource for a Massively Parallel System

Figure 4:
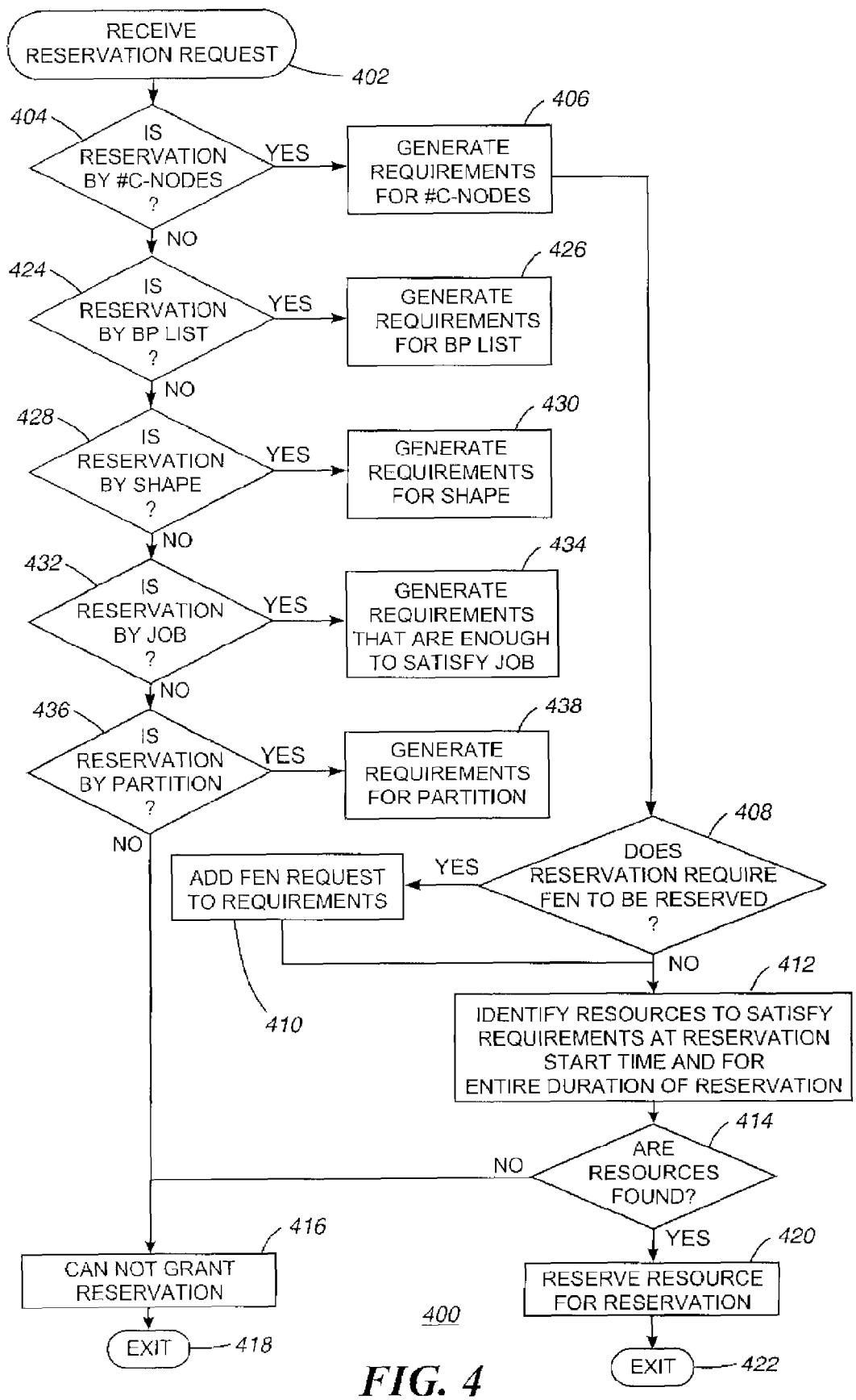
FIG. 4 is an operational flow diagram illustrating an exemplary process of reserving a resource for a massively parallel processing system according to an embodiment of the present invention.

FIG. 4 shows an exemplary process of reserving a resource for the massively parallel processing system 100 using an ARS 420. The operational flow diagram of FIG. 4 begins at step 402 and flows directly to step 404. The scheduler 130, at step 404, receives a reservation request. The request can be received in a number of formats. For example, the request may be inputted by an end user from a command line or by using a graphical user interface or an application programming interface. The request, however, does not need to necessarily be submitted by an end user and may be provided by another computer or even another environment. The ARS 420, at step 406, determines if the request specified a number of c-nodes. If the result of this determination is positive, the ARS 420, at step 406, creates set of requirements based on the request number of c-nodes. It should be noted that the actual number of c-nodes reserved for the request may be larger or smaller than what was requested The ARS 420, at step 408, determines whether the reservation requires a front end node 122 to be reserved. If the result of this determination is positive, the ARS 420, at step 410, adds the front end node request to the requirements. The control then flows to step 412. If the result of the above determination is negative, the ARS 420, at step 412, tries to locate resources that satisfy the requirements at reservation start time and for the entire duration of the reservation. The ARS 420, at step 414, determines if resources have been located. If the result of this determination is negative, the ARS 420, at step 416, determines that the reservation cannot be granted. If this occurs the user or system is notified. The control flow then exits at step 418.

If the result of the determination at step 414 is positive, the located resource(s) is reserved for reservation. The control flow then exits at step 422. Returning to step 404, if the result of the determination is negative, the ARS 420, at step 424, determines if the reservation request specified a BP list. If the result of this determination is positive, the ARS 420, at step 426, creates a set of requirements based on the requested BP list. The ARS 420 then performs the processes discussed above with respect to steps 408, 410, 412, 414, 416, 418, 420, and 422. If the result of the determination at step 424 is negative, the ARS 420, at step 428, determines if the reservation specifies a particular shape. If the result of this determination is positive, the ARS 420, at step 430, creates a set of requirements based on the specified shape.

Figure 5:
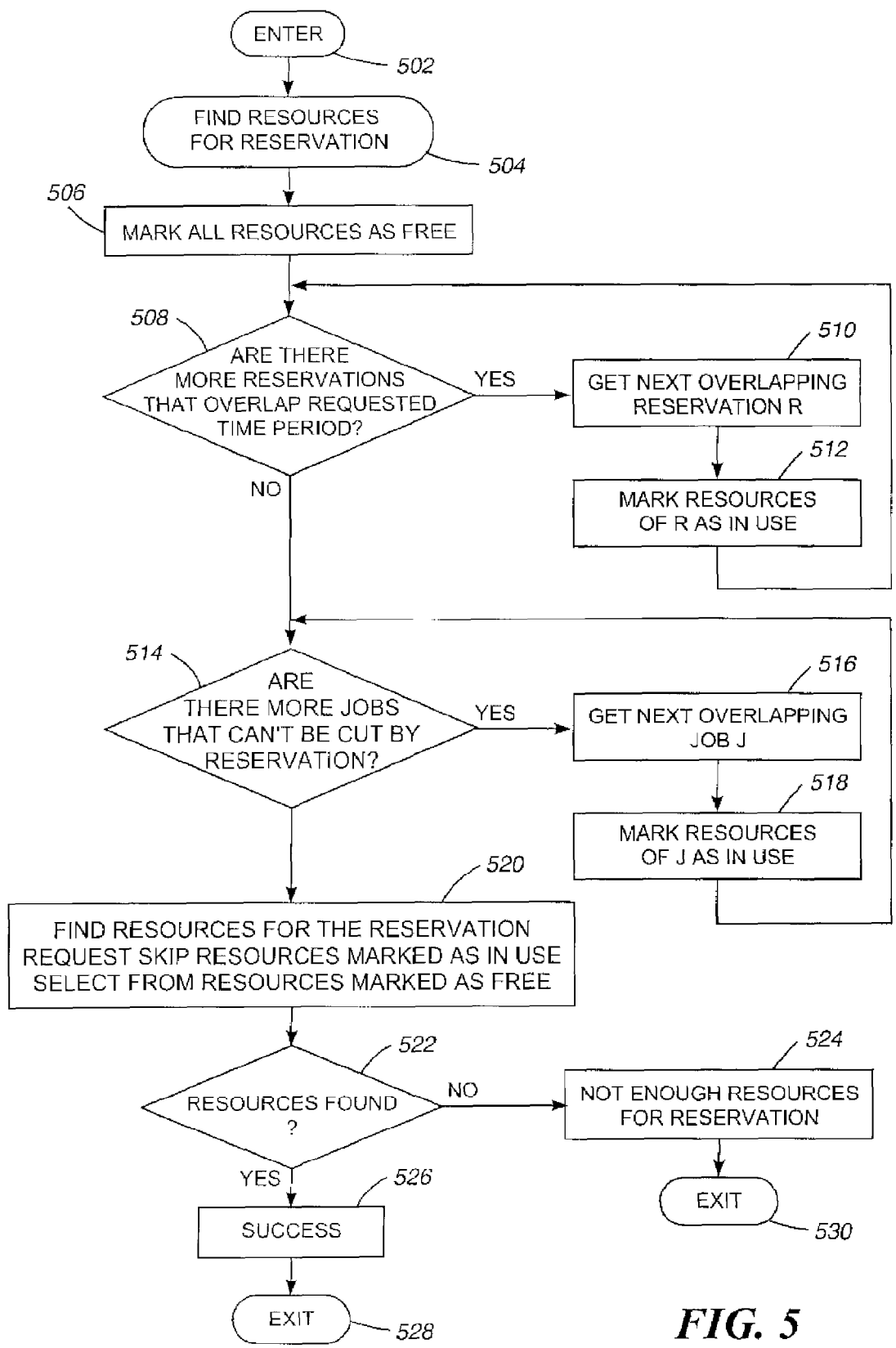
FIG. 5 is an operational flow diagram illustrating an exemplary process of locating resources for a reservation request according to an embodiment of the present invention.

The ARS 420 then performs the processes discussed above with respect to steps 408, 410, 412, 414, 416, 418, 420, and 422. If the result of the determination at step 428 is negative, the ARS 420, at step 432, determines if the request specified a particular job. If the result of this determination is positive, the ARS 420, at step 434, creates a set of requirements based on the specified job. The ARS 420 then performs the processes discussed above with respect to steps 408, 410, 412, 414, 416, 418, 420, and 422. If the result of the determination at step 432 is negative, the ARS 420, at step 436 determines if the request specified a particular partition. If the result of this determination is positive, the ARS 420, at step 438, creates a set of requirements based on the specified partition. The ARS 420 then performs the processes discussed above with respect to steps 408, 410, 412, 414, 416, 418, 420, and 422. If the result of the determination at step 436 is negative, the ARS 420, at step 416, determines that the reservation request cannot be granted and the control flow exits at step 418, Exemplary Process of Reserving a Resource for a Massively Parallel System FIG. 5 shows an exemplary process of locating resources for a reservation request. FIG. 5 is a more detailed flow of step 312 in FIG. 4. The operational flow diagram of FIG. 5 begins at step 502 and flows directly to step 504. The ARS 320, at step 504, locates resources for a reservation. The resources, at step 506, are marked as free. The ARS 320, at step 508, determines if any reservations overlap the requested time period of the current reservation. In other words, the ARS 320 determines if any resources belong to two or more reservations at the same time. If the result of this determination is positive, the ARS 320, at step 510, locates the next reservation R that overlaps with the time period requested by the current reservation. The resources that are assigned to the reservation R, at step 512, are marked as "in use". The control flows back to step 508 where the ARS 320 performs steps 510 and 512 for each remaining overlapping reservation. If no more overlapping reservations exist, the control flow continues at step 514.

If the result of the determination at step 508 is negative, the ARS 320, at step 514, determines if jobs that cannot overlap with the request reservation exist. Generally, a reservation is not allowed to reserve resources expected to be used by a currently running job. In special situations, administrators are allowed to create a reservation overlapping with a running job. If the result of this determination is positive, the ARS 320, at step 516, identifies the next job J that will be running at some point during the requested reservation time period and that cannot overlap with the request reservation. The resources assigned to the job J, at step 518, are marked as "in use". The control flows back to step 514 where the ARS 320 performs steps 516 and 518 for each remaining job that cannot be cut by reservation. If no more of these jobs exist, the control flow continues at step 520.

If the result of the determination at step 514 is negative, the ARS 320, at step 520, identifies resources to satisfy the set of requirements in the current reservation request. The ARS 320, in one embodiment, only selects resources that are marked as free and resources that are marked as "in use" are considered unavailable. The ARS 320, at step 522, determines if enough resources have been identified to satisfy the reservation request. If the result of this determination is negative, the ARS 320, at step 524, determines that enough resources have not been identified. The control flow then exits at step 530. If the result of the determination at step 522 is positive, the ARS 320, at step 526, determines that the process was a success and the control flow exits at step 528.

Exemplary Process of Scheduling Resources for a Reservation-Bound Job

Figure 6:
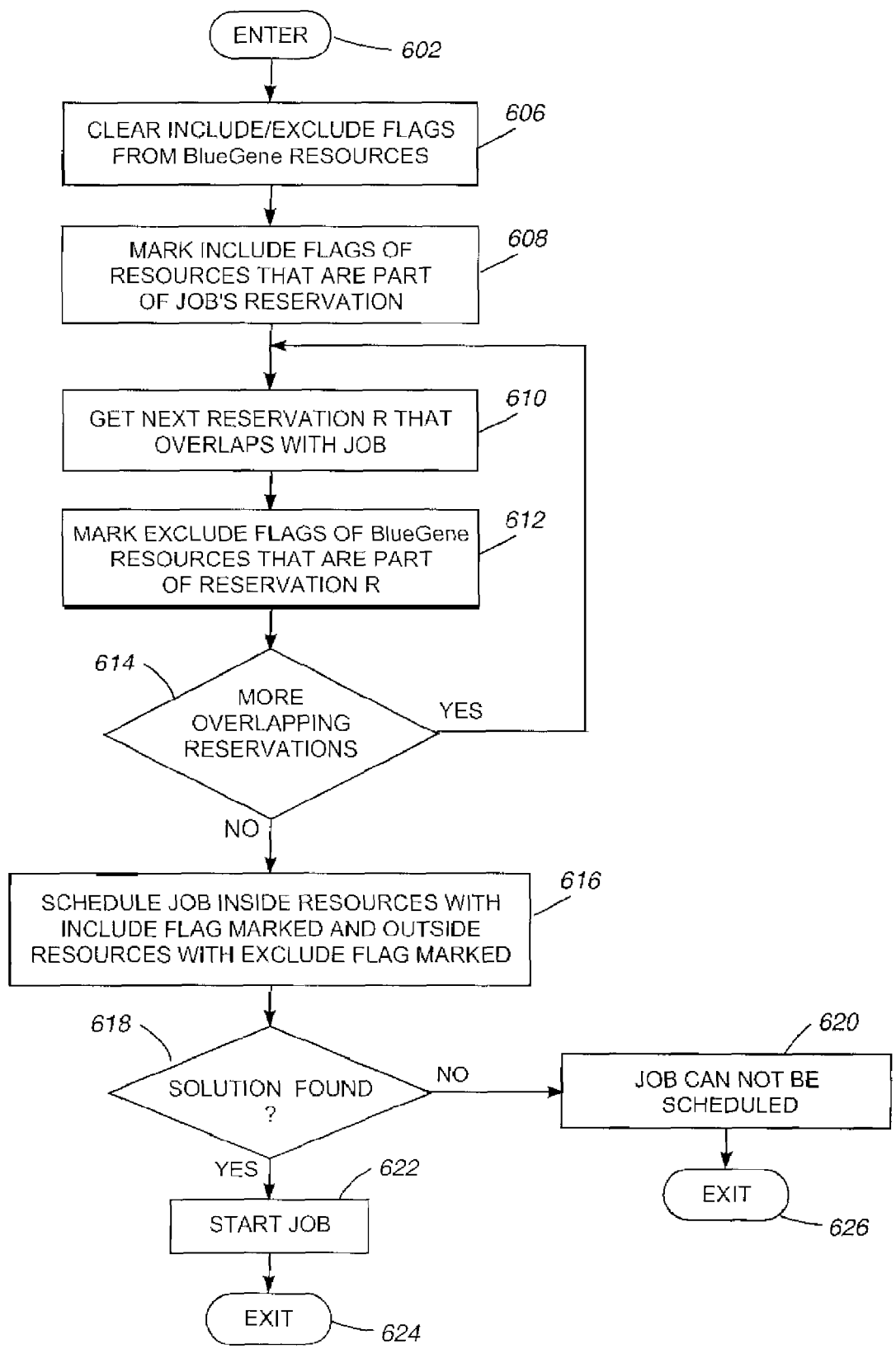
FIG. 6 is an operational flow diagram illustrating an exemplary process of scheduling resources in the massively parallel processing system according to an embodiment of the present invention.

FIG. 6 shows an exemplary process of scheduling resources in the massively parallel processing system 100 for a reservation bound-job. In other words, FIG. 6 shows an example of scheduling a reservation-bound job. FIG. 6 begins at step 602 and flows directly to step 606. The process of FIG. 6 can be performed by the service node 120, but is not restricted to a service node 120. For example, the process of FIG. 6 can also be performed by an information processing node that includes the job scheduler 130 and is communicatively coupled to the massively parallel computing database 124.

The ARS 320, at step 606, clears include and exclude flags from massively parallel computing resources. The resources that are part of the job's reservation, at step 608, are marked. The ARS 320, at step 610, retrieves the next reservation R (from a reservation list) that overlaps with the job excluding the job's reservation. The ARS 320, at step 612, marks exclude flags of resources that are part of the overlapping reservation R. The ARS 320, at step 614, determines if any more overlapping reservations exist. If the result of this determination is positive, the control flows back to step 610 where the ARS 320 performs steps 610, 612, and 614 until no more overlapping reservations exist.

If the determination at step 614 is negative, the ARS 320, at step 616, schedules the job within resources that have "include" flags marked. Resources with the "exclude" flag marked are ignored. The ARS 320, at step 618, determines if a solution for the job was found. If the result of this determination is negative, the ARS 320, at step 620, determines that the job cannot be scheduled. The control flow then exits at step 626. If the result of the determination at step 618 is positive, the ARS 320, at step 622, starts the job on the selected resources. The control flow then exits at step 624.

Exemplary Process of Binding a Job to a Reservation

Figure 7:
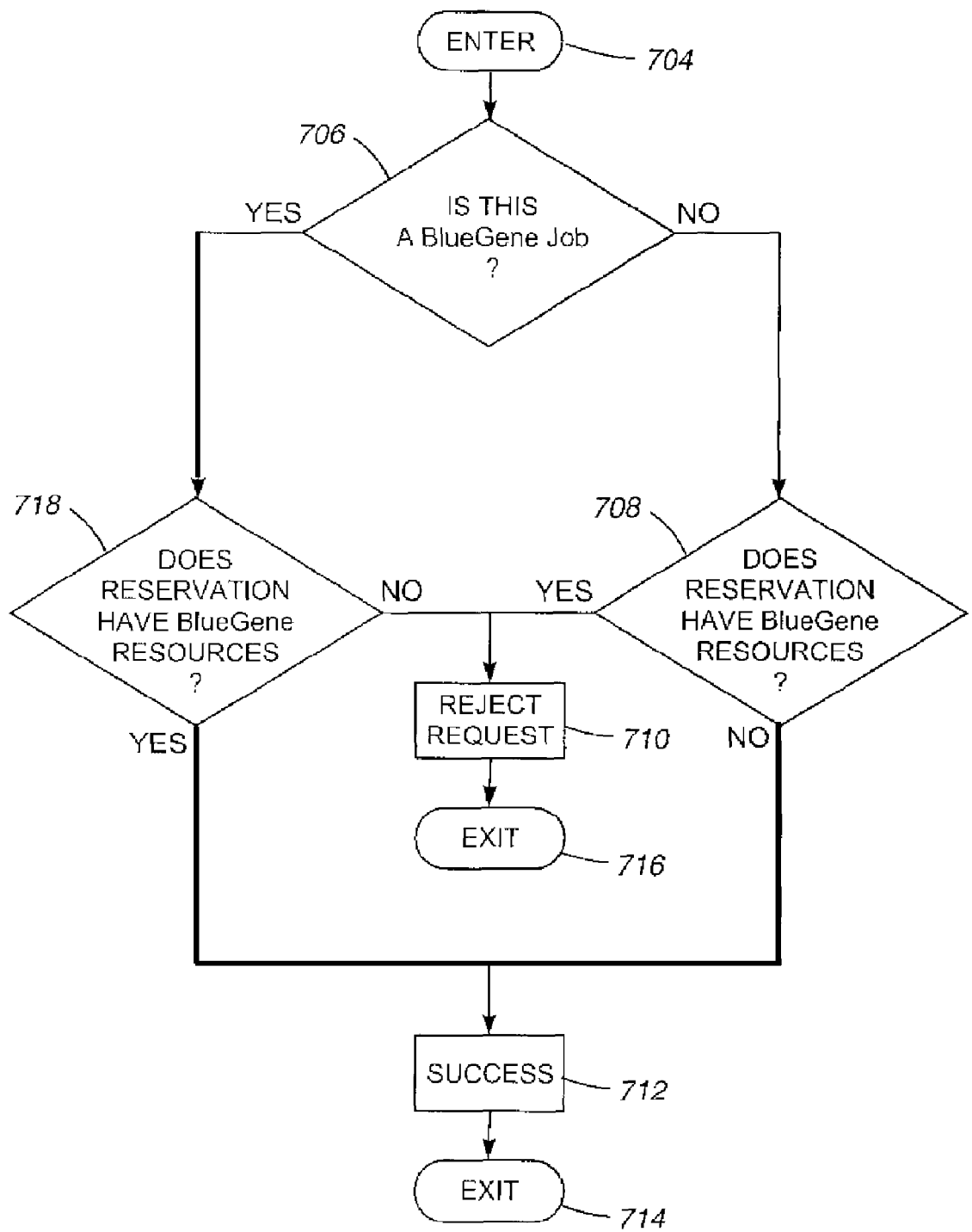
FIG. 7 is an operational flow diagram illustrating an exemplary process of binding a job to a reservation according to an embodiment of the present invention.

FIG. 7 shows an exemplary process of binding a job to a reservation. FIG. 7 begins at step 704 and flows directly to step 706. The process of FIG. 7 can be performed by the service node 120, but is not restricted to a service node 120. For example, the process of FIG. 7 can also be performed by an information processing node that includes the job scheduler 130 and is communicatively coupled to the massively parallel computing database 124. The ARS 320, at step 706, determines if the job is a massively parallel computing job. If the result of this determination is negative, the ARS 320, at step 708, determines if the reservation includes massively parallel computing resources. If the result of this determination is negative, the ARS 320, at step 712 binds the job to the reservation. The control flow then exits at step 714.

If the result of the determination at step 708 is positive, the request, at step 710, is rejected and the job is not bound to the reservation. The control flow then exits at step 716. Returning to step 706, if the result of this determination is positive, the ARS 320, at step 718, determines if the reservation includes massively parallel computing resources. If the result of this determination is positive, the ARS 320, at step 712 binds the job to the reservation. The control flow then exits at step 714. If the result of the determination at step 718 is negative, the request, at step 710, is rejected and the job is not bound to the reservation. The control flow then exits at step 716.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of reserving resources in a massively parallel processing system comprising, the method on an information processing node comprising a scheduler, the information processing node communicatively coupled to a database and the massively parallel processing system, the method comprising:
   receiving a reservation request for reserving at least one resource within a massively parallel processing system comprising a plurality of resources comprising compute nodes, base partitions, switches, wires, and node cards;
   determining a reservation type associated with the reservation, wherein the reservation type is at least one of: a number of compute nodes specified for a particular network type from among a torus and a mesh, a base partition list specified for the particular network type, and a particular partition comprising a specified selection of compute nodes, switches, wires, and node cards specified for the particular network type;
   generating a set of requirements based on the reservation type;
   identifying a set of resources from among the plurality of resources for satisfying the set of requirements by:
      marking each resource in the plurality of resources as available;
      determining if any of said plurality of resources are assigned to at least one other reservation during a requested time period associated with the received reservation request;
      marking, in response to at least one resource being assigned to at least one other reservation during the request time period, the at least one resource as being unavailable; and
      assigning the set of resources for the reservation request from a selection of the plurality of resources that meet the set of requirements and are marked as available, wherein the set of resources satisfy the set of requirements at a reservation start time and for an entire duration of the reservation;
   reserving the set of resources for the reservation request; and
   responsive to receiving a job bound to the reservation request;
      identifying the set of resources reserved for the reservation request;
      marking an include flag associated with each of the resources in the set of resources from among said plurality of resources;
      determining if an overlapping reservation exists, wherein the overlapping reservation overlaps a reservation time period associated with the job;
      identifying, in response to the overlapping reservation existing, each resource within the plurality of resources that is part of the overlapping reservation;
      marking an exclude flag associated with each of the identified resources; and
      scheduling the job with resources having the include flag marked and do not have the exclude flag marked from among the set of resources.

2. The method of claim 1, further comprising:
   determining if the reservation includes a request for a front end node to be reserved, wherein an initiating program for running the job is started on the front end node and the application executable is started on a partition from among said plurality of resources; and
   updating, in response to the reservation including the request, the set of requirements to include the front end node.

3. The method of claim 1, further comprising:
   determining if the job associated with the reservation is a massively parallel computing job;
   determining, in response to the job being a massively parallel computing job, if the reservation associated with the job includes massively parallel computing resources;
   allowing, in response to the reservation having massively parallel computing resources, the job to be bound to the reservation;
   determining, in response to the job failing to be a massively parallel computing job, if the reservation associated with the job includes massively parallel computing resources; and
   allowing, in response to the reservation not having massively parallel computing resources, the job to be bound to the reservation.

4. An information processing system for reserving resources in a massively parallel processing system comprising, the information processing system comprising:
   a memory;
   a processor communicatively coupled to the memory; and
   an advance reservation module communicatively coupled to the memory and the processor, wherein the advance reservation module is for:
   receiving a reservation request for reserving at least one resource within a massively parallel processing system comprising a plurality of resources comprising compute nodes, base partitions, switches, wires, and node cards;
   determining a reservation type associated with the reservation, wherein the reservation type is at least one of: a number of compute nodes specified for a particular network type from among a torus and a mesh, a base partition list specified for the particular network type, and a particular partition comprising a specified selection of compute nodes, switches, wires, and node cards specified for the particular network type;

generating a set of requirements based on the reservation type;

identifying a set of resources from among the plurality of resources for satisfying the set of requirements by:

marking each resource in the plurality of resources as available;

determining if any of said plurality of resources are assigned to at least one other reservation during a requested time period associated with the received reservation request;

marking, in response to at least one resource being assigned to at least one other reservation during the request time period, the at least one resource as being unavailable; and assigning the set of resources for the reservation request from a selection of the plurality of resources that meet the set of requirements and are marked as available, wherein the set of resources satisfy the set of requirements at a reservation start time and for an entire duration of the reservation;

reserving the set of resources for the reservation request; and responsive to receiving a job bound to the reservation request:

identifying the set of resources reserved for the reservation request;

marking an include flag associated with each of the resources in the set of resources from among said plurality of resources;

determining if an overlapping reservation exists, wherein the overlapping reservation overlaps a reservation time period associated with the job;

identifying, in response to the overlapping reservation existing, each resource within the plurality of resources that is part of the overlapping reservation;

marking an exclude flag associated with each of the identified resources; and scheduling the job with resources having the include flag marked and do not have the exclude flag marked from among the set of resources.

5. The information processing system of claim 4, wherein the advance reservation module is further for:

determining if the reservation includes a request for a front end node to be reserved, wherein an initiating program for running the job is started on the front end node and the application executable is started on a partition from among said plurality of resources; and updating, in response to the reservation including the request, the set of requirements to include the front end node.

6. The information processing system of claim 4, wherein the advance reservation module is further for:

determining if the job associated with the reservation is a massively parallel computing job;

determining, in response to the job being a massively parallel computing job, if the reservation associated with the job includes massively parallel computing resources;

allowing, in response to the reservation having massively parallel computing resources, the job to be bound to the reservation;

determining, in response to the job failing to be a massively parallel computing job, if the reservation associated with the job includes massively parallel computing resources; and allowing, in response to the reservation not having massively parallel computing resources, the job to be bound to the reservation.

7. A computer readable medium for reserving resources in a massively parallel processing system comprising, the computer readable medium comprising instructions for:

receiving a reservation request for reserving at least one resource within a massively parallel processing system comprising a plurality of resources comprising compute nodes, base partitions, switches, wires, and node cards;

determining a reservation type associated with the reservation, wherein the reservation type is at least one of: a number of compute nodes specified for a particular network type from among a torus and a mesh, a base partition list specified for the particular network type, and a particular partition comprising a specified selection of compute nodes, switches, wires, and node cards specified for the particular network type;

generating a set of requirements based on the reservation type;

identifying a set of resources from among the plurality of resources for satisfying the set of requirements by:

marking each resource in the plurality of resources as available;

determining if any of said plurality of resources are assigned to at least one other reservation during a requested time period associated with the received reservation request;

marking, in response to at least one resource being assigned to at least one other reservation during the request time period, the at least one resource as being unavailable; and assigning the set of resources for the reservation request from a selection of the plurality of resources that meet the set of requirements and are marked as available, wherein the set of resources satisfy the set of requirements at a reservation start time and for an entire duration of the reservation;

reserving the set of resources for the reservation request; and responsive to receiving a job bound to the reservation request:

identifying the set of resources reserved for the reservation request;

marking an include flag associated with each of the resources in the set of resources from among said plurality of resources;

determining if an overlapping reservation exists, wherein the overlapping reservation overlaps a reservation time period associated with the job;

identifying, in response to the overlapping reservation existing, each resource within the plurality of resources that is part of the overlapping reservation;

marking an exclude flag associated with each of the identified resources; and scheduling the job with resources having the include flag marked and do not have the exclude flag marked from among the set of resources.

8. The computer readable medium of claim 7, further comprising instructions for:

determining if the reservation includes a request for a front end node to be reserved; and updating, in response to the reservation including the request, the set of requirements to include the front end node;

determining if the job associated with the reservation is a massively parallel computing job;

determining, in response to the job being a massively parallel computing job, if the reservation associated with the job includes massively parallel computing resources;

allowing, in response to the reservation having massively parallel computing resources, the job to be bound to the reservation;

determining, in response to the job failing to be a massively parallel computing job, if the reservation associated with the job includes massively parallel computing resources; and allowing, in response to the reservation not having massively parallel computing resources, the job to be bound to the reservation.

* * * * *